(12) United States Patent
Nishio et al.

(10) Patent No.: US 9,217,398 B2
(45) Date of Patent: Dec. 22, 2015

(54) GAS ENGINE HAVING INTERCOOLER

(75) Inventors: Hideki Nishio, Tokyo (JP); Hajime Suzuki, Tokyo (JP); Yuuichi Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 354 days.

(21) Appl. No.: 13/701,190

(22) PCT Filed: Jun. 27, 2011

(86) PCT No.: PCT/JP2011/064720
§ 371 (c)(1),
(2), (4) Date: Nov. 30, 2012

(87) PCT Pub. No.: WO2012/002341
PCT Pub. Date: Jan. 5, 2012

(65) Prior Publication Data
US 2013/0067913 A1   Mar. 21, 2013

(30) Foreign Application Priority Data
Jun. 28, 2010   (JP) ................................ 2010-145954

(51) Int. Cl.
*F02G 3/00*    (2006.01)
*F02M 31/20*   (2006.01)
(Continued)

(52) U.S. Cl.
CPC ............ *F02M 31/20* (2013.01); *F02B 29/0406* (2013.01); *F02B 29/0468* (2013.01);
(Continued)

(58) Field of Classification Search
CPC ... Y02T 10/121; Y02T 10/144; Y02T 10/146; Y02T 10/32; B01D 5/0033; F01N 3/005; F02B 29/0406; F02B 29/0468; F02B 37/00; F02B 43/02; F02B 47/02; F02D 19/12; F02M 25/00; F02M 35/022; F25J 2200/02; F25J 2205/10; F25J 2210/04; F25J 3/0209
USPC ......... 60/614, 617, 605.2; 123/250, 267, 275, 123/DIG. 12, 574; 62/48.1, 620
See application file for complete search history.

(56) References Cited

U.S. PATENT DOCUMENTS 6,221,130 B1 *   4/2001   Kolodziej et al. ................. 95/41
8,397,680 B2 *   3/2013   Shimada et al. .................. 123/3
(Continued)

FOREIGN PATENT DOCUMENTS

CN   1831318 A   9/2006
CN   101405494 A   4/2009
(Continued)

OTHER PUBLICATIONS

Translation of the International Preliminary Report on Patentability (PCT/ISA/237) (4 pages), (PCT/IB/373) (1 page) of International Application No. PCT/JP2011/064720 mailed Jan. 24, 2013 (Form PCT/IB1338) (1 page), (Form PCT/IB/326) (1 page).
(Continued)

*Primary Examiner* — Jesse Bogue
*Assistant Examiner* — Thomas Olszewski
(74) *Attorney, Agent, or Firm* — Westerman, Hattori, Daniels & Adrian, LLP (57) ABSTRACT

In a gas engine 1 that uses a gas having a lower specific gravity than air and has a pre-mixing device before a turbocharger, a pre-mixed gas mixture compressed by a turbocharger 3 is cooled by an intercooler 4 located downstream of the turbocharger 3 in the intake system. Condensed water produced as the gas is cooled and the pre-mixed gas mixture discharged with the condensed water are separated into condensed water, air, and fuel gas in a vapor-liquid separator 7. The fuel gas is returned to the intake system upstream of the turbocharger 3, while the condensed water is discharged to atmosphere.

5 Claims, 4 Drawing Sheets

(51) Int. Cl.
    *F02M 33/04* (2006.01)
    *F02B 29/04* (2006.01)
    *F02M 21/02* (2006.01)
    *F02B 37/00* (2006.01)
    *F02D 19/02* (2006.01)
    *F02M 21/04* (2006.01)

(52) U.S. Cl.
    CPC .............. *F02B37/00* (2013.01); *F02D 19/027* (2013.01); *F02M 21/0215* (2013.01); *F02M 21/0284* (2013.01); *F02M 33/04* (2013.01); *F02M 21/047* (2013.01); *Y02T 10/146* (2013.01); *Y02T 10/32* (2013.01)

(56) References Cited

U.S. PATENT DOCUMENTS

| | | | |
|---|---|---|---|
| 2004/0045514 A1* | 3/2004 | Qian et al. | 123/3 |
| 2004/0079079 A1* | 4/2004 | Martin et al. | 60/605.2 |
| 2005/0205022 A1 | 9/2005 | Ito et al. | |
| 2007/0227186 A1* | 10/2007 | Alferov et al. | 62/620 |
| 2008/0276627 A1 | 11/2008 | Lee et al. | |
| 2010/0089071 A1* | 4/2010 | Hofmann | 62/48.1 |

FOREIGN PATENT DOCUMENTS

| | | |
|---|---|---|
| CN | 101457697 A | 6/2009 |
| JP | 60-216061 A | 10/1985 |
| JP | 10-184471 A | 7/1998 |
| JP | 2005-226476 A | 8/2005 |
| JP | 2009-092005 A | 4/2009 |
| JP | 2010-019247 A | 1/2010 |
| JP | 2010-19247 A | 1/2010 |
| WO | 2009/151073 A | 12/2009 |

OTHER PUBLICATIONS

Office Action dated May 28, 2014, issued in corresponding Chinese Patent Application No. 201180027018.5, with English Translation (11 pages).
Japanese Notice of Allowance dated Jan. 29, 2013, issued in corresponding Japanese Patent Application No. 2010-145954, w/ English translation.
International Search Report for PCT/JP2011/064720, mailing date of Jul. 26, 2011.
Korean Notice of Allowance dated Sep. 25, 2013, issued in corresponding Korean Patent Application No. 10-2012-7025377 with English translation (4 pages).
Chinese Notice of Allowance dated Oct. 30, 2014, issued in corresponding CN Application No. 201180027018.5 with English translation (4 pages).

* cited by examiner

GAS ENGINE HAVING INTERCOOLER

TECHNICAL FIELD

The present invention relates to a gas engine that has an intercooler and makes effective use of natural gas, biogas, or methane gas emitted from coal mines or the like as intake gas or fuel.

BACKGROUND ART

The world's interest in restrictions on emissions of green house gases such as methane $CH_4$ and carbon dioxide $CO_2$ has been increasing over the years. Methane $CH_4$, in particular, is 21 times more potent than carbon dioxide $CO_2$ in driving the global warming, and therefore emissions of methane $CH_4$ to atmosphere should not be left unnoticed. In the meantime, a large amount of methane $CH_4$, as much as 10 to 40 $Nm^3$ (pure methane) per ton of coal, is being released during coal mining from a coal mine.

Coal mines emit two types of methane $CH_4$ gas: CMM (Coal Mine Methane) gas (with a concentration of about 30 to 50 wt %), existing in and recovered from coal seams through degassing bore holes using vacuum pumps for safety reasons, and VAM (Ventilation Air Methane) gas (with a concentration of 0.3 to 0.7 wt %) released through ventilation from the mine tunnels and the coal face.

Therefore, effective use of the methane contained in the gases emitted from coal mines without releasing it to atmosphere will make significant economic and social contributions.

Patent Document 1 discloses a gas turbine capable of making use of gases with a methane concentration of below the explosion limit, such as landfill gas produced in the landfill, or the gases emitted from coal mines as mentioned above, as fuel.

Patent Document 2 discloses a gas engine for power generation using methane gas emitted from a coal mine as fuel. The gas engine power generating facility will be described with reference to FIG. 4 attached herewith, which shows a sketch of the inside of a coal mine in more detail than FIG. 5 of Patent Document 2.

Figure 4:
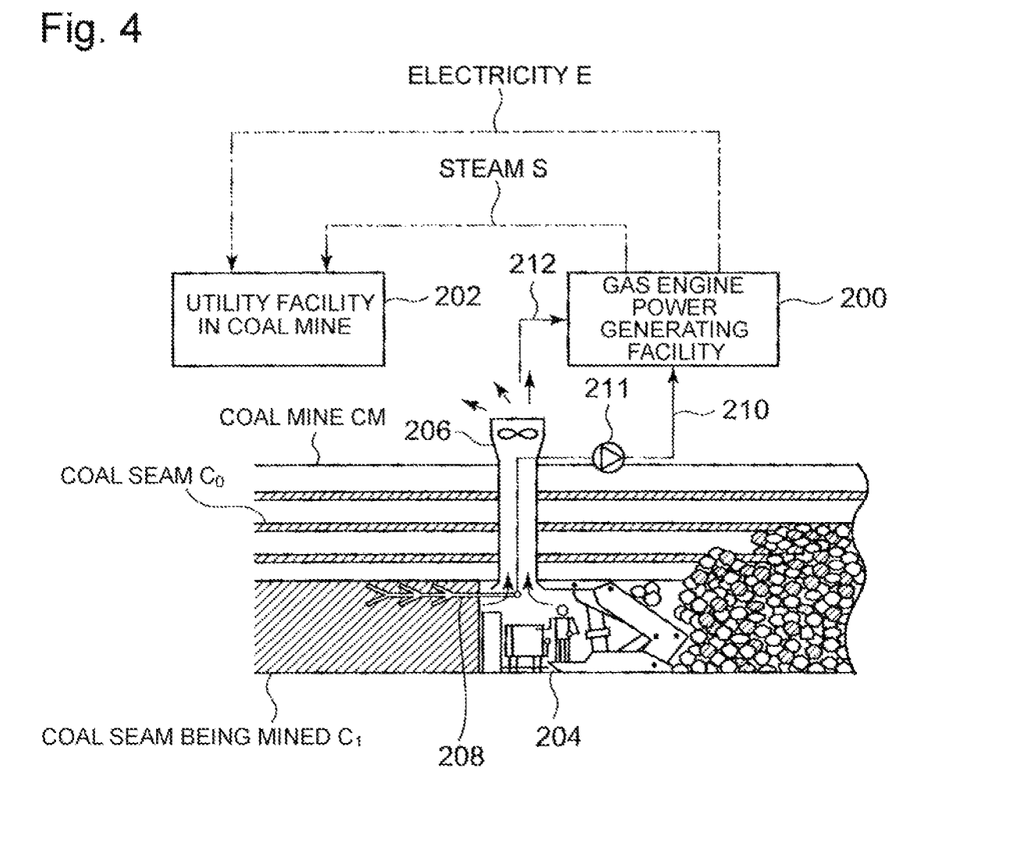
FIG. 4 is a diagram for explaining a conventional technique.

FIG. 4 is a schematic illustration of a coal mine and a gas engine power generating facility 200 built near the coal mine. In FIG. 4, inside the coal mine are layers of coal seams $C_0$ and the coal seam being mined $C_1$.

A ventilation hole 206 is provided for communicating the inside of the coal mine with the outside.

In the coal face 204 of the coal mine, degassing bore holes 208 are drilled in the coal seam being mined $C_1$, and CMM gas emitted from the bore holes 208 is sent to the gas engine power generating facility 200 through a pipe 210 disposed inside the ventilation hole 206 by means of a vacuum pump 211.

The ventilation air methane gas VAM emitted from the coal mine through the ventilation hole 206 is sent to the gas engine power generating facility 200 through a pipe 212. Electric power E and steam S generated through operation of the gas engine power generating facility 200 are sent to a utility facility 202 in the mine premises or further to other consumers.

Patent Document 1: Japanese Patent Application Publication No. 2010-19247
Patent Document 2: US Patent Application Publication No. 2005/0205022 (Description)

Gas engines that use methane gas as fuel are an internal combustion engine expected to be used widely in future because of their advantage that they emit only water $H_2O$ and carbon dioxide $CO_2$ as combustion products and thus cause very little pollution to the environment.

In an engine using a low energy gas such as methane as fuel, the amount of fuel supplied to the respective cylinders from fuel gas supply solenoid valves is insufficient, and the shortage needs to be complemented through the intake system. Complementing this shortage of fuel gas before a turbocharger is a common practice referred to as pre-mixing before a turbocharger.

Pre-mixed gas mixture containing fuel gas mixed therein is compressed by the turbocharger, after which it is cooled by an intercooler so that water vapor contained in the intake gas condenses into water drops. Part of the pre-mixed gas mixture is released as drain gas with the water drops when the water is discharged.

However, as noted above, methane $CH_4$ is 21 times more potent than carbon dioxide $CO_2$ in driving the global warming. Also, discharging compressed pre-mixed gas mixture leads to a decrease in volumetric efficiency and thermal efficiency of the internal combustion engine.

DISCLOSURE OF THE INVENTION

In view of these problems in the conventional techniques, an object of the present invention is to improve the thermal efficiency of a gas engine that uses a low energy gas as fuel and to reduce emission of harmful gas to atmosphere through reuse of the fuel gas contained in drain gas by vapor-liquid separation in a container having an enough capacity to reduce the pressure of the pre-mixed gas mixture to or below its dew point after it has been discharged with drain water, to return the fuel gas back to the intake system while discharging the water to the outside.

The present invention achieves the above object by providing a gas engine having an intercooler, including: a turbocharger for compressing intake gas to the gas engine that uses gas as a fuel; a pre-mixing device provided before the turbocharger in an intake system and mixing a fuel gas with air to produce a pre-mixed gas mixture upstream of the turbocharger; the intercooler located downstream of the turbocharger in the intake system, cooling the pre-mixed gas mixture that has been compressed by the turbocharger, and having a drain valve for discharging condensed water produced through cooling of the pre-mixed gas mixture; a vapor-liquid separator connected to the drain valve via a first conduit and separating the pre-mixed gas mixture discharged with the condensed water, from the condensed water; and a second conduit through which the pre-mixed gas mixture separated in the vapor-liquid separator flows to the upstream of the turbocharger in the intake system.

With the apparatus of the present invention configured to separate the pre-mixed gas mixture containing pre-mixed fuel gas from condensed water instead of discharging the gas with the water to atmosphere, and to direct the pre-mixed gas mixture to the upstream of the turbocharger in the intake system, the thermal efficiency of the gas-fueled engine is improved.

Moreover, the apparatus provides an effect of preventing air pollution, as unburnt fuel gas is not released to atmosphere.

In the present invention, preferably, the fuel gas may be a gas having a lower specific gravity than air, and the vapor-liquid separator may have a capacity that allows the pre-mixed gas mixture discharged with the condensed water to have a pressure equal or close to an atmospheric pressure, and have a collecting part disposed in an upper part for collecting the pre-mixed gas mixture.

With such a configuration, vapor-liquid separation of the pre-mixed gas mixture is promoted as the pressure of the pre-mixed gas mixture is reduced to equal or close to an atmospheric pressure, so that there will be no condensed water in the pre-mixed gas mixture returned to the intake system with the fuel gas, whereby corrosion of parts forming the intake system can be prevented.

In the present invention, preferably, a drain valve control unit may further be provided, which controls the drain valve to open and close based on a suction temperature (Tsuc) of the pre-mixed gas mixture entering the turbocharger detected by a first intake gas temperature sensor disposed upstream of the turbocharger, and an intake temperature (Ts) and an intake pressure (Ps) of the pre-mixed gas mixture detected by a second intake gas temperature sensor and an intake gas pressure sensor disposed on an outlet side of the intercooler.

With such a configuration, the drain valve can be closed when there is no condensed water inside the intercooler so that an unnecessary discharge of the pre-mixed gas mixture is prevented to minimize a decrease in the volumetric efficiency of the gas engine.

In the present invention, preferably, the drain valve control unit may keep the intake temperature (Ts) and the intake pressure (Ps) on the outlet side of the intercooler constant through control of the intercooler and the turbocharger, calculate, based on a map, a reference suction temperature (Tstd) of the pre-mixed gas mixture entering the turbocharger when the pre-mixed gas mixture has a relative humidity of 100% on the outlet side of the intercooler with the intake temperature (Ts) and the intake pressure (Ps) being kept constant, and keep the drain valve closed when an actual measurement of the suction temperature (Tsuc) is lower than the calculated reference suction temperature (Tstd).

With such a configuration, through control of the opening and closing of the drain valve when an actual measurement of the suction temperature (Tsuc) is lower than the reference suction temperature (Tstd) of the pre-mixed gas mixture entering the turbocharger calculated based on a map, a decrease in the volumetric efficiency of the gas engine can be minimized.

In the present invention, preferably, the collecting part of the vapor-liquid separator may be positioned lower in a direction of gravity than an intake passage forming member disposed upstream of the turbocharger in the intake system.

With such a configuration, the fuel gas having a lower specific gravity than air is separated from the pre-mixed gas mixture in the vapor-liquid separator, and as the fuel gas is separated upward, it flows spontaneously into the intake passage formed by the intake passage forming member, so that the apparatus can be made simpler and the cost can be reduced.

According to the present invention, fuel gas and moisture are separated from the intake gas mixture that contains the fuel gas and that is discharged from the intercooler together with water that has condensed therein, and the fuel gas is returned to the intake system, while the water is released to atmosphere. Therefore, the thermal efficiency of the engine is improved by the amount of separated fuel gas, and the effect of preventing air pollution is increased, as unburnt fuel gas is not released to atmosphere.

Furthermore, the number of times of discharging compressed pre-mixed gas mixture is reduced by controlling the opening and closing of the drain valve of the intercooler, so that a drop in the volumetric efficiency of the gas engine can be minimized.

BEST MODE FOR CARRYING OUT THE INVENTION

The illustrated embodiments of the present invention will be hereinafter described in detail.

It should be noted that, unless otherwise specified, the size, material, shape, and relative arrangement or the like of constituent components described in these embodiments are only illustrative examples and not intended to limit the scope of this invention.

Figure 1:
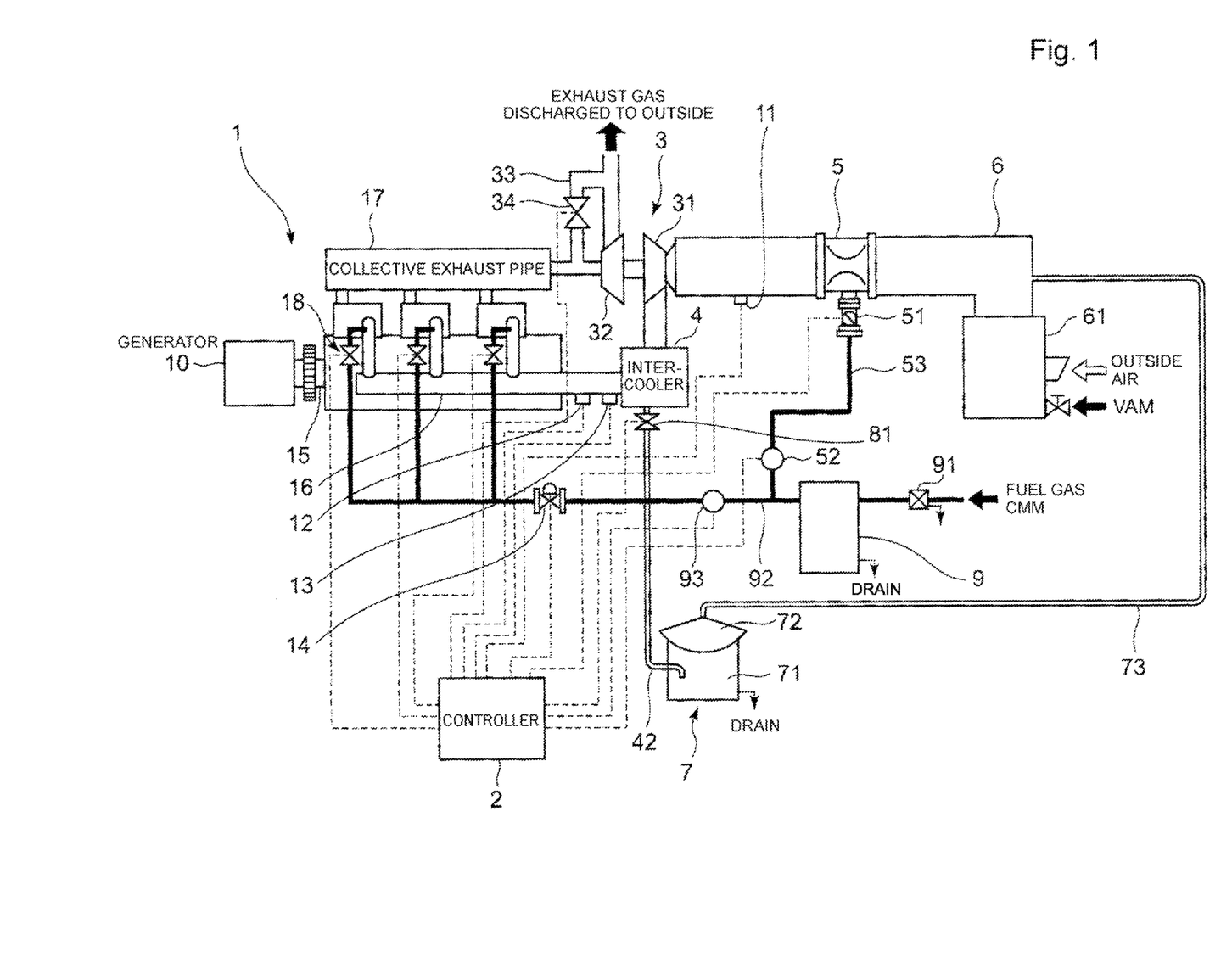
FIG. 1 is a schematic configuration diagram of a gas engine according to one embodiment of the present invention.

One embodiment of the gas engine according to the present invention will be described with reference to FIG. 1 to FIG. 3.

The power generating gas engine 1 of this embodiment is installed near a coal mine, and uses methane gas emitted from a coal mine as fuel gas and intake gas. In FIG. 1, a generator 10 is coupled to an output shaft 15 of the power generating gas engine 1 (hereinafter referred to as gas engine 1).

An oil bath filter 61 is disposed in an intake system upstream of an intake pipe 6 which is an intake passage forming member connected to the gas engine 1. Ventilation air methane VAM gas released through ventilation from the mine tunnels and the coal face of the coal mine and outside air are introduced into the oil bath filter 61. The oil bath filter 61 is made of steel fiber in the form of a sponge impregnated with oil for removing, primarily, dust and the like.

A gas mixer 5 is interposed in a middle part of the intake pipe 6 and upstream of the turbocharger 3. The gas mixer 5 generates a pre-mixed gas mixture by mixing fuel gas with the intake gas from the oil bath filter 61 upstream of the turbocharger 3 and can be termed as pre-mixing device before a turbocharger.

Pre-mixing is performed in a system that uses a low energy gas, as the gas directly supplied to the gas engine 1 as fuel falls short of a necessary amount.

Fuel gas is supplied to the gas mixer 5 through a pre-mixing pipe 53, which bifurcates from a fuel gas supply pipe 92 to the engine 1 to be described later. Reference numeral 52 denotes a flowmeter of the fuel gas. The measurements of the flowmeter 52 are sent to the controller 2. The controller 2 adjusts the amount of gas supplied to the gas mixer 5 by controlling the flow rate of gas to a mixer valve 51, based on the measurements.

The turbocharger 3 is disposed downstream of the intake pipe 6 in the intake system, which spins the exhaust gas turbine 32 with exhaust gas from a common exhaust pipe 17 of the gas engine 1 to drive a compressor 31 coaxially coupled with the exhaust gas turbine 32 to compress the pre-mixed gas mixture in the intake pipe 6.

A first intake gas temperature sensor 11 (Tsuc) is disposed between the gas mixer 5 in the intake pipe 6 and the turbocharger 3 for measuring the temperature of the pre-mixed gas mixture. The measurements of the first intake gas temperature sensor 11 (Tsuc) are sent to the controller 2. The measurements are used as one control element of a drain valve 81 to be described later. Reference numeral 34 represents an exhaust gas flow rate control valve disposed in an exhaust gas bypass pipe 33 for the exhaust gas from the common exhaust pipe 17 to bypass the exhaust gas turbine 32, and operated by the controller 2. The exhaust gas flow rate control valve 34 adjusts the flow rate of exhaust gas into the exhaust gas turbine 32 to adjust the pressure of the compressor 31.

An intercooler 4 for cooling the pre-mixed gas mixture after it has been compressed by the turbocharger 3 is disposed downstream of the turbocharger 3 in the intake system. Water vapor contained in the pre-mixed gas mixture condenses to water drops as the gas is cooled by the intercooler 4, and the water is guided into a vapor-liquid separator 7 from the drain valve 81 of the intercooler 4 through a first conduit or a drain pipe 42. The intercooler 4 cools the pre-mixed gas mixture to increase the gas concentration for better power output of the gas engine 1, as well as removes water vapor from the pre-mixed gas mixture by condensation to prevent corrosion of various parts forming the intake system.

An intake manifold 16 having branch pipes connected to the respective cylinders of the gas engine 1 for introducing the pre-mixed gas mixture into the cylinders is coupled downstream of the intercooler 4 in the intake system. To the intake manifold 16 are provided a second intake gas temperature sensor 12 that detects the intake temperature Ts of the pre-mixed gas mixture introduced from the intercooler 4 and sends the measurements to the controller 2, and an intake gas pressure sensor 13 that detects the intake pressure Ps and sends the measurements to the controller 2. These measurements are used as control elements of a drain control valve 8 to be described later.

A strainer 91 disposed upstream of the fuel gas supply pipe 92 is a primary filtering device for removing dust, steam and the like contained in the CMM (Coal Mine Methane) gas (with a concentration of 30 to 50 wt %) that is the fuel gas. A fuel demister 9, which is a secondary filtering device, further removes mist from the fuel gas that has passed through the strainer 91.

The reason why such a two-stage cleaning device is disposed is to remove impurities from the fuel gas to eliminate any adverse effects to the gas engine 1, as the gas emitted from a coal mine contains much dust, steam and the like.

Part of the fuel gas having passed through the fuel demister 9 is supplied to the gas mixer 5 through a pre-mixing pipe 53 bifurcating from the fuel gas supply pipe 92 for the pre-mixing before the turbocharger mentioned above.

Most of the fuel gas is supplied to the respective cylinders of the gas engine 1 through the fuel gas supply pipe 92.

The controller 2 controls the pressure control valve 14 for adjusting the pressure of the fuel gas, and gas supply solenoid valves 18 provided for each of the cylinders of the gas engine 1 based on the measurements of a fuel gas flowmeter 93 disposed in the fuel gas supply pipe 92 for detecting the flow rate of the fuel gas, so as to adjust the flow rate of the fuel gas entering the respective cylinders.

The drain valve 81 is mounted to the underside of the intercooler 4 for discharging drain water (moisture) to the outside of the intercooler 4.

The drain control unit 8 is configured by the drain valve 81 attached to the bottom of the intercooler 4, the vapor-liquid separator 7 for separating drain water from the pre-mixed gas mixture, the drain pipe 42 that is the first conduit communicating the drain valve 81 with the vapor-liquid separator 7, a return pipe 73 that is a second conduit for returning the separated fuel gas to the intake pipe 6, the first intake gas temperature sensor 11, the second intake gas temperature sensor 12, the intake gas pressure sensor 13, and the controller 2 having a map for controlling the opening/closing of the drain valve 81.

After passing through the drain valve 81 of the intercooler 4, drain water and compressed pre-mixed gas mixture are introduced into the vapor-liquid separator 7 through the drain pipe 42.

The vapor-liquid separator 7 has a space 71 of a capacity that allows the compressed pre-mixed gas mixture to return to an atmospheric pressure or close thereto. As the pressure of the pre-mixed gas mixture lowers, the water vapor contained in the intake gas condenses and thus moisture is separated from the pre-mixed gas mixture.

Moreover, a fuel gas collector 72 having a conical space therein is disposed at the top of the vapor-liquid separator 7. This is for collecting methane gas contained in the pre-mixed gas mixture. Having a lower specific gravity than air, methane gas separates from air and collects at the top (fuel gas collector 72) inside the vapor-liquid separator 7. One end of the return pipe 73 that is the second conduit opens to the top of the conical fuel gas collector 72, while the other end opens in a middle part of the intake pipe 6 between the gas mixer 5 and the oil bath filter 61.

The fuel gas collector 72 of the vapor-liquid separator 7 is located lower in the direction of gravity than the other end of the return pipe 73. As a result, the methane gas collected in the fuel gas collector 72, together with part of air, moves up and spontaneously enters the intake pipe 6 to be used again as fuel, so that the thermal efficiency of the engine is improved accordingly.

Air inside the vapor-liquid separator 7 is discharged to atmosphere with drain water accumulated therein.

Aside from the advantage that a cost increase of the whole system is minimized because the fuel gas spontaneously enters the intake pipe, the greenhouse effect is prevented as no methane is released to atmosphere.

Figure 2A:
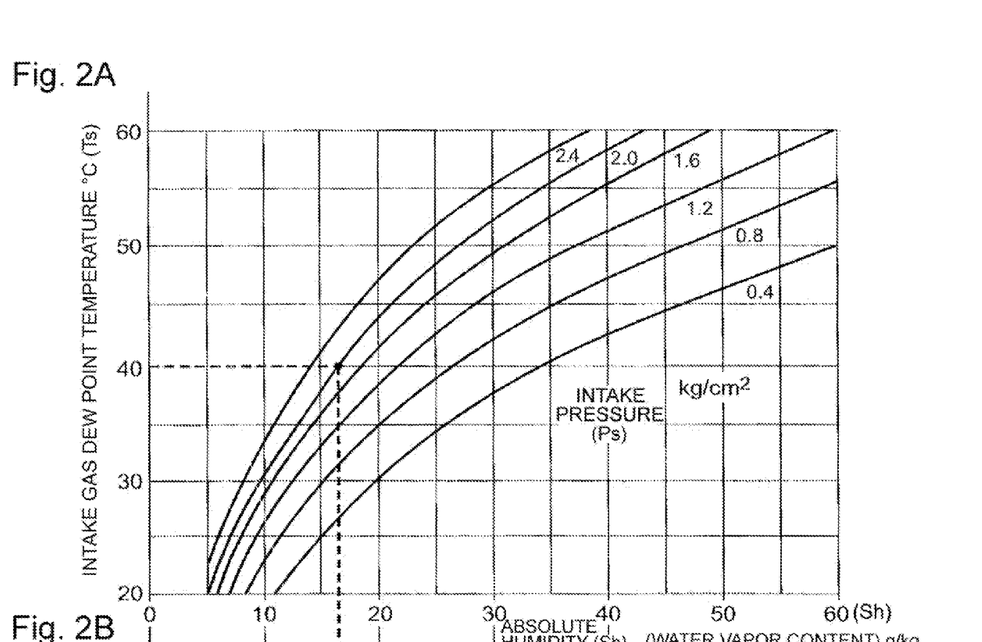
FIGS. 2A and 2B are maps for controlling the opening and closing of a drain valve used in the gas engine according to the embodiment of the present invention, FIG. 2A showing the relationship between intake gas dew point temperature Ts and absolute humidity Sh relative to intake pressure Ps, and FIG. 2B showing the relationship between absolute humidity g/kg and reference suction temperature (Tstd) on the turbocharger side relative to relative humidity.
Figure 2B:
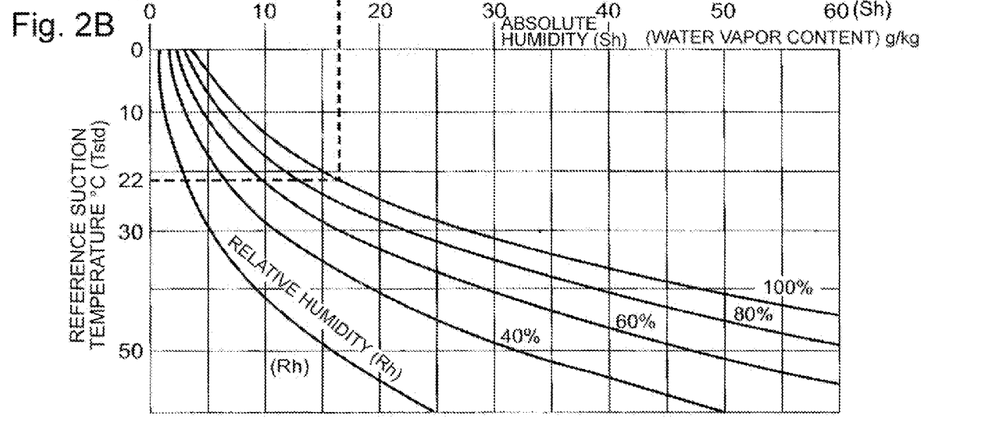
Figure 3:
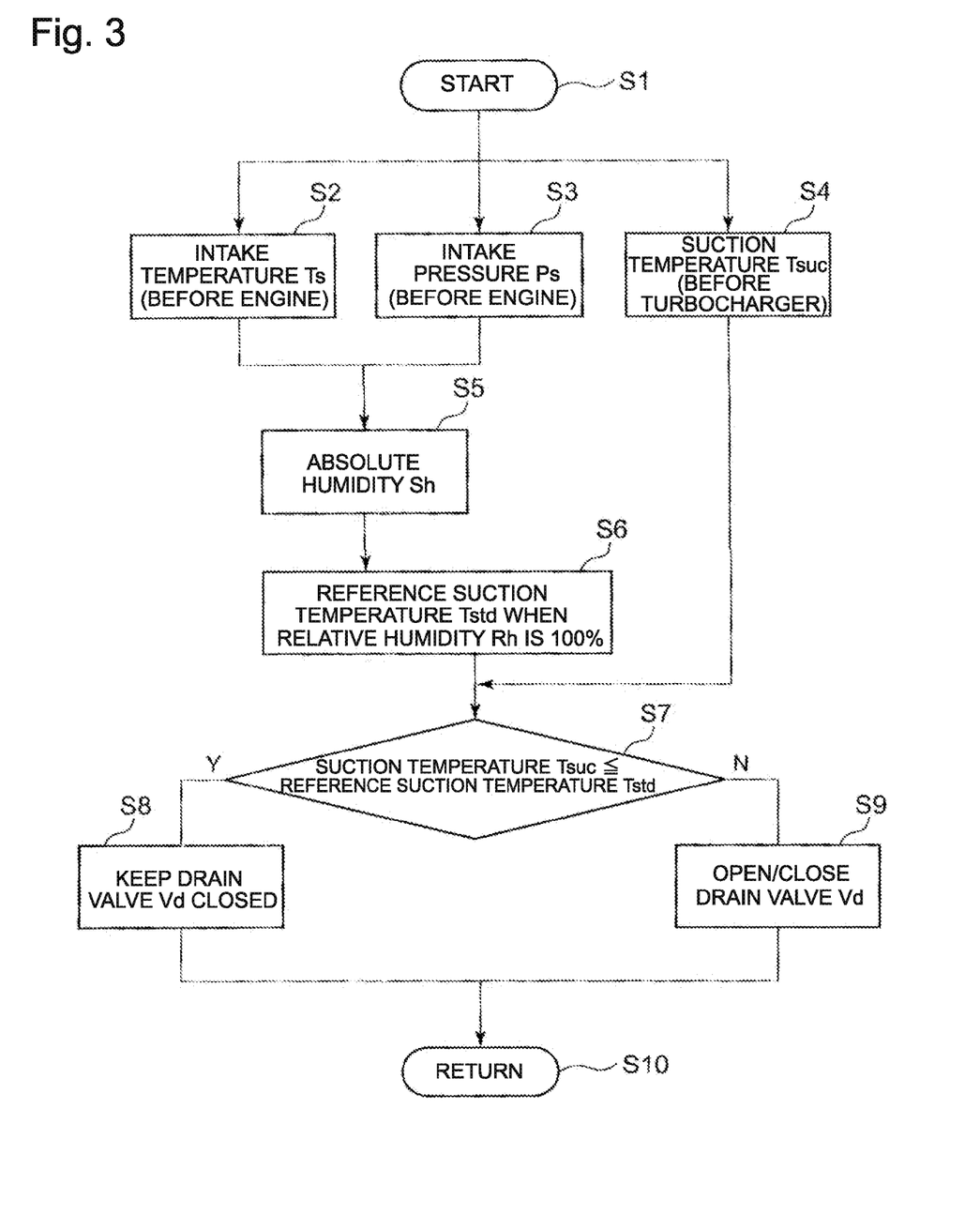
FIG. 3 is a diagram showing the flow of control of the opening and closing of the drain valve according to one embodiment of the present invention.

FIGS. 2A and 2B are examples of maps for controlling the opening and closing of the drain valve according to this embodiment.

The map for controlling the opening and closing of the drain valve in FIG. 2A shows the relationship between intake gas dew point temperature Ts and absolute humidity Sh relative to intake pressure Ps, the vertical axis representing the intake gas dew point temperature Ts (intake temperature) and the horizontal axis representing the absolute humidity Sh (water vapor content g/kg) relative to the intake pressure Ps.

The controller 2 controls the intercooler 4 and the turbocharger 3 such as to keep the intake temperature Ts and intake pressure Ps on the outlet side of the intercooler constant (gas engine output).

Since the pre-mixed gas mixture has been cooled by the intercooler 4 to remove any redundant water vapor by condensation, the water vapor in the pre-mixed gas does not condense at the measured intake temperature Ts and intake pressure Ps (relative humidity being 100%), so that the intake temperature Ts can be regarded as intake gas dew point temperature Ts.

FIG. 2B shows the relationship between absolute humidity g/kg and reference suction temperature (Tstd) on the turbocharger side relative to the relative humidity, the horizontal axis representing the absolute humidity Sh (water vapor content) g/kg, and the vertical axis representing the reference suction temperature Tstd (dry-bulb temperature) of the turbocharger 3.

This map has been obtained from test results of the gas engine 1 of this embodiment and is based on the performances of the turbocharger 3 and the air intercooler 4.

Referring to FIGS. 2A and 2B when the intake temperature intake pressure Ps are kept constant, for example, Ts=40° C. and Ps=2 kg/cm², the reference suction temperature Tstd of the turbocharger 3 when the relative humidity is 100% is 22° C. Since the absolute humidity Sh will be lower if the suction temperature Tsuc of gas actually entering the turbocharger 4 is equal to or lower than the reference suction temperature, the water vapor contained in the pre-mixed gas mixture entering the turbocharger 4 does not condense on the outlet side of the intercooler 4.

In other words, if the temperature of the pre-mixed gas mixture entering the turbocharger 3 is 22° C. and the relative humidity is 100%, the intake temperature Ts and the intake pressure Ps after passing through the intercooler 4 will be maintained at 40° C. and 2 kg/cm², respectively. Since the temperature of the pre-mixed gas mixture is equal to the intake gas dew point temperature Ts, if the pre-mixed gas mixture entering the turbocharger 3 (suction temperature Tsuc) is 22° C. or lower, the absolute humidity will be lower, so that the water vapor contained in the pre-mixed gas mixture will not condense inside the intercooler 4.

Accordingly, there will be no drain water, so that, with the drain valve 81 kept closed, the pre-mixed gas mixture will not be discharged from the intercooler 4 with water, whereby a drop in volumetric efficiency of the gas engine 1 can be prevented.

The flow of control will be explained with reference to FIG. 3.

The process starts at step S1. At step S2, the intake temperature Ts of the pre-mixed gas mixture after it has passed through the intercooler (before engine) is detected by the second intake gas temperature sensor 12. At step S3, the intake pressure Ps of the pre-mixed gas mixture after it has passed through the intercooler 4 (before engine) is detected by the intake gas pressure sensor 13. At step S4, the suction temperature (Tsuc) of the pre-mixed gas mixture before it enters the turbocharger 3 is detected by the first intake gas temperature sensor 11.

At step S5, the absolute humidity (Sh) is calculated from the intake temperature (Ts) and intake pressure (Ps) using the map (FIG. 2A).

At step S6, the reference suction temperature (Tstd) when the relative humidity (Rh) is 100%, with the absolute humidity (Sh) calculated at step S5, is calculated using the map (FIG. 2B).

At step S7, the suction temperature (Tsuc) detected at step S4 is compared with the reference suction temperature (Tstd) (to see if Tsuc≤Tstd).

If Yes, the process goes to step S8, where the drain valve Vd is kept closed, and the process is returned at step S10. If No, the process goes to step S9, where the drain valve Vd periodically discharges drain water (condensed water) to the vapor-liquid separator 7, and the process is returned at step S10.

According to the embodiment of the present invention, the fuel gas (methane) contained in the pre-mixed gas mixture and condensed water are separated by the intercooler 4 and the vapor-liquid separator 7, allowing the fuel gas (methane) to flow back into the intake system upstream of the turbocharger, while condensed water is drained to atmosphere from the vapor-liquid separator 7. Thereby, aside from the advantage that the thermal efficiency of the engine can be improved, an effect of reducing air pollution is achieved, as unburnt methane gas is not released to atmosphere.

Draining the condensed water to atmosphere from the vapor-liquid separator 7 provides the effect of preventing corrosion of parts forming the intake system passage.

Opening the drain valve inevitably allows discharge of compressed pre-mixed gas mixture together with the condensed water. However, it has been determined that there will be no condensation of moisture (drain water) if the suction temperature (Tsuc) is lower than a threshold (reference suction temperature Tstd) under constant conditions with certain suction temperature (Tsuc) of the turbocharger 3, and intake temperature (Ts) and intake pressure (Ps) on the outlet side of the intercooler 4. Therefore, the system includes a drain valve control unit for controlling the drain valve in a drain system to remain closed to reduce emission of compressed pre-mixed gas mixture, thereby to minimize a decrease in volumetric efficiency of the gas engine.

INDUSTRIAL APPLICABILITY

The invention is applicable to gas engines that use a low energy gas as fuel and have a pre-mixing device before a turbocharger for pre-mixing part of fuel with air, for minimizing a decrease in volumetric efficiency resulting from operation of the drain system, and for improving the fuel efficiency by recovery of fuel gas contained in the drain gas.

The invention claimed is:

1. A gas engine having an intercooler, comprising:
   a turbocharger for compressing intake gas to the gas engine that uses a gas as fuel;
   a pre-mixing device provided before the turbocharger in an intake system and configured to mix a fuel gas with air to produce a pre-mixed gas mixture upstream of the turbocharger;
   the intercooler, which is located downstream of the turbocharger in the intake system, is configured to cool the pre-mixed gas mixture that has been compressed by the turbocharger, and has a drain valve for discharging condensed water produced through cooling of the pre-mixed gas mixture;
   a vapor-liquid separator configured to separate the pre-mixed gas mixture discharged with the condensed water, from the condensed water;
   a first conduit configured to communicate between the drain valve and the vapor-liquid separator, the first conduit introducing the condensed water discharged from the drain valve and the pre-mixed gas mixture discharged with the condensed water to the vapor-liquid separator; and
   a second conduit configured to return the pre-mixed gas mixture separated in the vapor-liquid separator to upstream of the turbocharger in the intake system,
   wherein the pre-mixed gas mixture returned to the upstream of the turbocharger in the intake system is configured to be supplied to the intercooler again after having been compressed in the turbocharger.

2. The gas engine having an intercooler according to claim 1, wherein the fuel gas is a gas having a lower specific gravity than air, and wherein the vapor-liquid separator has a capacity that allows the pre-mixed gas mixture discharged with the condensed water to have a pressure equal or close to an atmospheric pressure, and has a collecting part disposed in an upper part for collecting the pre-mixed gas mixture.

3. The gas engine having an intercooler according to claim 1, further comprising a drain valve control unit configured to control the drain valve to open and close based on a suction temperature (Tsuc) of the pre-mixed gas mixture entering the turbocharger detected by a first intake gas temperature sensor disposed upstream of the turbocharger, and an intake temperature (Ts) and an intake pressure (Ps) of the pre-mixed gas mixture detected by a second intake gas temperature sensor and an intake gas pressure sensor disposed on an outlet side of the intercooler.

4. The gas engine having an intercooler according to claim 3, wherein the drain valve control unit is configured to: keep the intake temperature (Ts) and the intake pressure (Ps) on the outlet side of the intercooler constant through control of the intercooler and the turbocharger; calculate, based on a map, a reference suction temperature (Tstd) of the pre-mixed gas mixture entering the turbocharger when the pre-mixed gas mixture has a relative humidity of 100% on the outlet side of the intercooler with the intake temperature (Ts) and the intake pressure (Ps) being kept constant; and keep the drain valve closed when an actual measurement of the suction temperature (Tsuc) is lower than the calculated reference suction temperature (Tstd).

5. The gas engine having an intercooler according to claim 2, wherein the collecting part of the vapor-liquid separator is configured to be positioned lower in a direction of gravity than an intake passage forming member disposed upstream of the turbocharger in the intake system.

* * * * *